United States Patent [19]
Giebel et al.

[11] Patent Number: 5,745,633
[45] Date of Patent: Apr. 28, 1998

[54] FIBER OPTIC CABLE ASSEMBLY FOR SECURING A FIBER OPTIC CABLE WITHIN AN INPUT PORT OF A SPLICE CLOSURE

[75] Inventors: Markus A. Giebel, Hickory; Charles K. Adams, Newton, both of N.C.

[73] Assignee: Siecor Corporation, Hickory, N.C.

[21] Appl. No.: 773,040

[22] Filed: Dec. 24, 1996

[51] Int. Cl.$^6$ ............................................. G02B 6/00
[52] U.S. Cl. .................................. 385/136; 385/135
[58] Field of Search ................................ 385/135–138, 385/76, 86, 87, 100, 147; 174/70 R, 72 R, 77 R, 138 F, 139, 140 R; 156/158

[56] References Cited

U.S. PATENT DOCUMENTS

| | | | |
|---|---|---|---|
| 4,928,135 | 5/1990 | Kayoun et al. | 385/136 |
| 5,042,901 | 8/1991 | Merriken et al. | 385/135 |
| 5,416,874 | 5/1995 | Giebel et al. | 385/100 |
| 5,425,121 | 6/1995 | Cooke et al. | 385/112 |
| 5,426,715 | 6/1995 | Moisson et al. | 385/76 |
| 5,568,584 | 10/1996 | Smith | 385/135 |
| 5,598,499 | 1/1997 | Burek et al. | 385/138 |

Primary Examiner—Rodney B. Bovernick
Assistant Examiner—Hemang Sanghavi

[57] ABSTRACT

The fiber optic cable assembly secures a fiber optic cable within an input port of a splice closure without extending significantly beyond the walls of the splice closure. In addition to a fiber optic cable, the fiber optic cable assembly includes a plug encasing a portion of the fiber optic cable such that the fiber optic cable extends both forwardly from the plug into the splice closure and rearwardly from the plug away from the splice closure. The plug typically has a predetermined shape and size which matches the predetermined shape and size of the input port. Since the end of the input port which opens into the splice closure is partially closed, the plug is retained within the input port and does not extend into the interior cavity defined within the splice closure. In order to further retain the plug within the input port, the fiber optic cable assembly includes a retaining member mounted upon a portion of the fiber optic cable rearward of the plug for operably engaging the opposite end of the input port. The various components of the fiber optic cable assembly are therefore disposed within the input port and do not extend significantly beyond the wall of the splice closure. In addition, the fiber optic cable assembly provides strain relief and torsion relief to the optical fibers due to the secure engagement by the plug of the fiber optic cable.

19 Claims, 1 Drawing Sheet

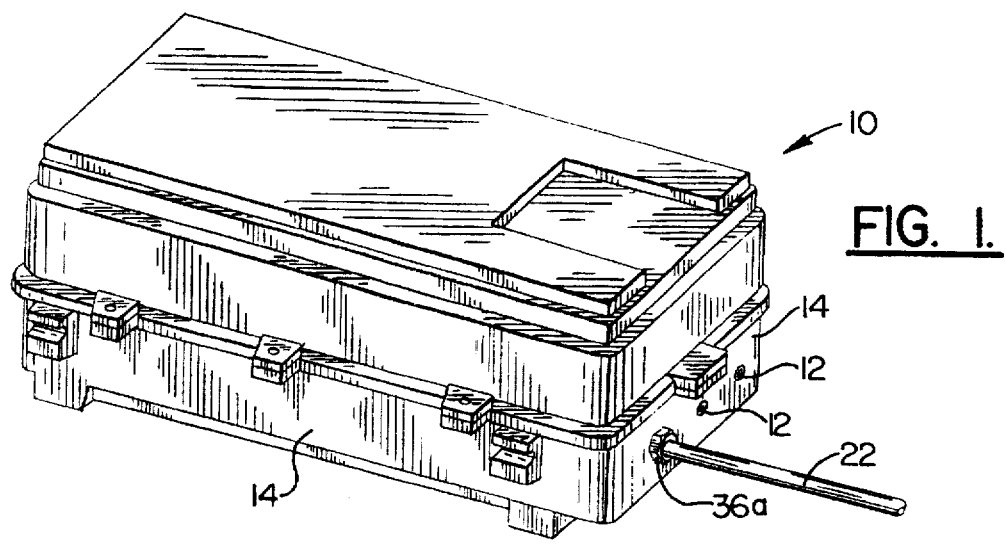
FIG. 1.
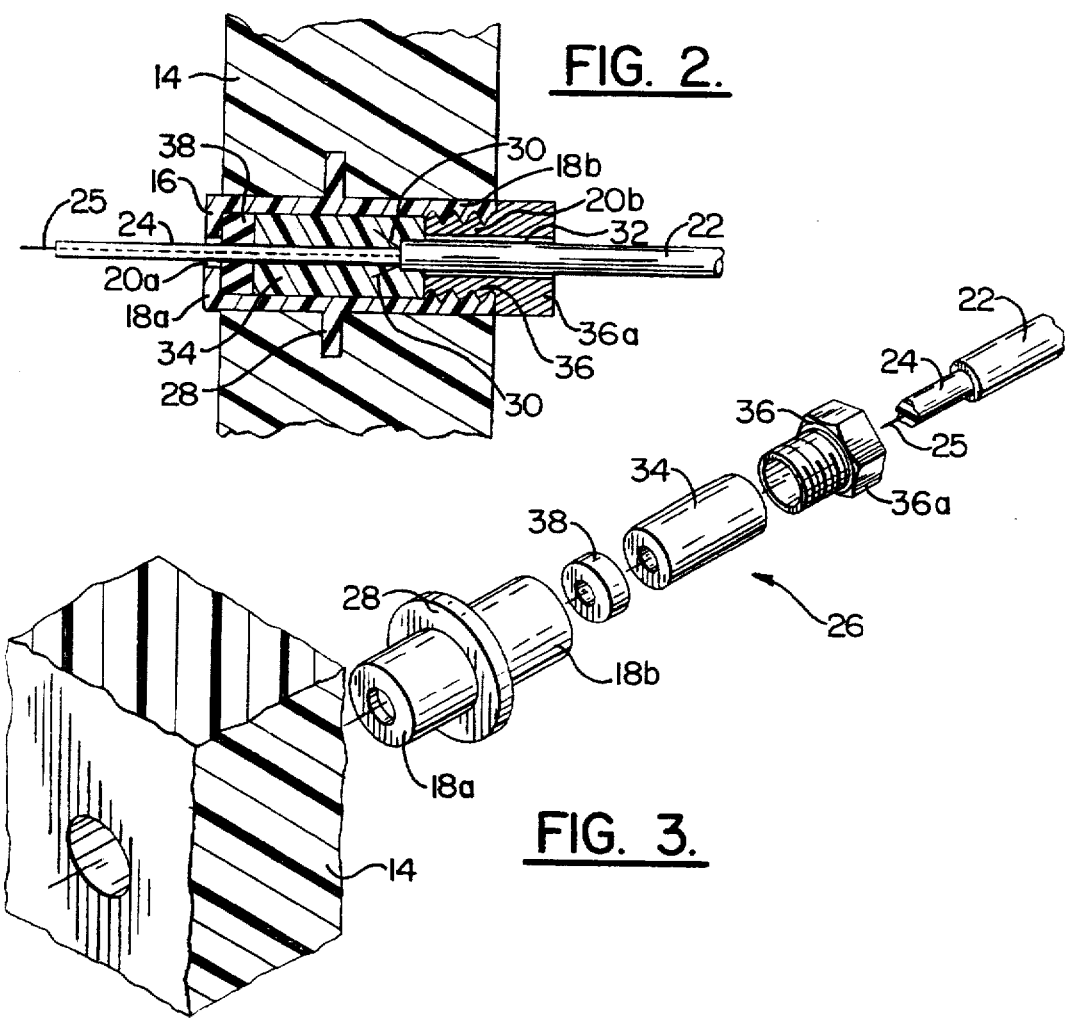
FIG. 2.
FIG. 3.

FIBER OPTIC CABLE ASSEMBLY FOR SECURING A FIBER OPTIC CABLE WITHIN AN INPUT PORT OF A SPLICE CLOSURE

BACKGROUND OF THE INVENTION

The present invention relates generally to a fiber optic cable assembly for securing a fiber optic cable within an input port of a splice closure and, more particularly, to a fiber optic cable assembly for securing a fiber optic cable within the input port of a splice closure so as to provide strain relief, torsion relief and a barrier to water migration into the splice closure.

Optical fibers are used in an increasing number and variety of applications, such as a wide variety of telecommunications and data transmission applications. As a result, fiber optic networks must include an ever increasing number of splices in order to optically connect various ones of the optical fibers.

Typically, optical fibers are spliced within an enclosure or housing, hereinafter referred to as a splice closure. The splice closure protects the optical fibers, such as from moisture or other forms of environmental degradation. The splice closure also preferably isolates or otherwise protects the optical fibers within the splice closure from strain or torque imparted to a portion of the fiber optic cable outside of the splice closure in order to maintain proper alignment and spacing between the spliced optical fibers and to prevent undesirable signal attenuation.

Splice closures have typically included hardware, such as one or more brackets, mounted within the internal cavity for providing strain relief and torsion relief to the optical fibers. In particular, the strength member of a fiber optic cable could be attached to a bracket mounted within the splice closure. Thus, any strain or torque imparted to portions of the fiber optic cable outside of the splice closure would be transmitted to the bracket mounted within the splice closure, thereby protecting or isolating the optical fibers from these externally imparted forces.

Splice closures typically include a number of input ports through which fiber optic cables extend. Each input port of one conventional splice closure includes an annular female retainer through which a fiber optic cable extends. In order to connect the fiber optic cable to the annular female retainer of this conventional splice closure, a male retaining nut and a grommet are also typically mounted upon the fiber optic cable. Since the grommet is disposed upon the fiber optic cable forward of the male retaining nut, the grommet is held within the annular female retainer upon the engagement of the male retaining nut and the female retainer. Since the male retaining nut and the female retainer are typically threaded, the threaded advancement of the male retaining nut within the female retainer serves to axially compress the grommet, thereby causing the grommet to radially expand. As a result of this radial expansion, the grommet provides a watertight seal which prevents moisture from entering the splice enclosure via the input port.

Even though conventional splice closures provide strain relief, torsion relief and a barrier to water migration, conventional splice closures require brackets or other hardware to be mounted within the splice closure to engage the strength members of the fiber optic cables. However, these brackets further complicate the design of the splice closure and require technicians to connect the strength member of each fiber optic cable to a respective bracket in order to provide the necessary strain relief and torsion relief for the optical fibers within the splice closure. Accordingly, several other cable assemblies have been developed to provide strain relief and torsion relief for optical fibers entering a splice closure, as well as to serve as a barrier to water migration into the splice closure.

In this regard, U.S. Pat. No. 5,416,874 to Markus A. Giebel, et al. describes a cable assembly for connecting a fiber optic cable to a splice closure. As described by U.S. Pat. No. 5,416,874, the fiber optic cable is prepared by removing the protective jacket from an end portion of the cable such that the strength member and one or more optical fibers extend outwardly from the transitional region of the fiber optic cable at which the protective jacket ends. The cable assembly of U.S. Pat. No. 5,416,874 includes a rigid aluminum tubular jacket positioned over the transitional region of the fiber optic cable such that the end of the protective jacket is disposed within the rigid aluminum tubular jacket. The rigid aluminum tubular jacket is then filled with an epoxy. Upon curing, the epoxy filled jacket securely engages the strength member of the fiber optic cable which extends outwardly beyond the protective jacket of the fiber optic cable.

As described by U.S. Pat. No. 5,416,874, one end of the rigid aluminum tubular jacket is threaded. As a result, the threaded portion of the jacket can engage a threaded female retainer which is embedded within the wall of a splice closure such that the optical fibers extend into the splice closure for subsequent optical connection to other optical fibers. As a result of the engagement of the strength member of the fiber optic cable by the epoxy within the jacket, the cable assembly of U.S. Pat. No. 5,416,874 provides both strain relief and torsion relief to the optical fibers within the splice closure. In addition, the epoxy filled jacket provides a barrier to water migration into the splice closure.

Another cable assembly as described by U.S. Pat. No. 5,425,121 to Terry L. Cooke, et al. In addition to the rigid jacket positioned about the transitional region of the fiber optic cable as described by U.S. Pat. No. 5,416,874, the cable assembly of U.S. Pat. No. 5,425,121 further includes a water impervious plug. The water impervious plus is formed about a portion of the fiber optic cable forward of the rigid jacket. As a result, the plug is inserted into and extends within the internal cavity defined by the splice closure upon engagement of the threaded portion of the rigid jacket with the input port of the splice closure in order to provide additional protection for the optical fibers.

While the cable assemblies described by U.S. Pat. Nos. 5,416,874 and 5,425,121 connect a fiber optic cable with the input port of a splice closure in a manner which provides strain relief, torsion relief and a barrier to water migration, these cable assemblies include a rigid jacket which extends outwardly from the wall of the splice closure. As a result, additional space must be provided around the splice closure such that the rigid jacket can extend outwardly therefrom. However, splice closures are oftentimes disposed within a cabinet or other cavity of limited size which may not have sufficient room for the rigid jackets to extend outwardly therefrom. In addition, the cable assembly described by U.S. Pat. No. 5,425,121 includes a plug which extends into the internal cavity defined by the splice closure, thereby reducing the space available for routing and splicing of the optical fibers.

SUMMARY OF THE INVENTION

It is therefore an object of the present invention to provide an improved fiber optic cable assembly for securing a fiber optic cable within an input port of a splice closure in a manner which provides strain relief, torsion relief and a barrier to water migration.

It is another object of the present invention to provide a fiber optic cable assembly for securing a fiber optic cable within the input port of a splice closure in a manner which reduces the space required by the splice closure.

It is a further object of the present invention to provide a fiber optic cable assembly for securing a fiber optic cable within the input port of a splice closure which does not extend significantly outward from a wall of the splice closure.

These and other objects are provided, according to the present invention, by a fiber optic cable assembly for providing a sealed junction within an input port of a splice closure. The input port is preferably formed by a sleeve mounted within a wall of the splice closure and extending between opposed first and second ends. The first and second ends of the sleeve define respective apertures through which the fiber optic cable extends. In addition to a fiber optic cable, the fiber optic cable assembly of the present invention includes a plug encasing a portion of the fiber optic cable such that the fiber optic cable extends both forwardly from the plug into the splice closure and rearwardly from the plug away from the splice closure. The plug has a predetermined shape and size which advantageously matches the predetermined shape and size of the internal cavity defined by the sleeve. In addition, the plug is larger than the aperture defined by the first end of the sleeve which opens into the splice closure such that the plug is retained within the sleeve. In order to further retain the plug within the sleeve, the fiber optic cable assembly of the present invention includes a retaining member mounted upon a portion of the fiber optic cable rearward of the plug for operably engaging the second end of the sleeve.

Thus, the various components of the fiber optic cable assembly of the present invention are disposed within the input port and, more particularly, within the sleeve mounted within a wall of the splice closure such that the fiber optic cable assembly does not extend significantly beyond the wall of the splice closure. As a result, the space required to connect a fiber optic cable to the input port of a splice closure is reduced by the fiber optic cable assembly of the present invention.

The plug is preferably comprised of a water impervious material, such an epoxy. As a result, the plug prevents water migration into the splice closure. The fiber optic cable assembly can also include an annular grommet mounted about a portion of the fiber optic cable adjacent the plug. The grommet also has a predetermined shape and size such that the grommet can be disposed within the sleeve. As the retaining member engages the sleeve, such as by threadably advancing the retaining member within the sleeve, the grommet is compressed which causes the grommet to expand radially, thereby providing an additional barrier to water migration into the splice closure.

In one advantageous embodiment, the fiber optic cable is prestubbed by removing the protective jacket from the end portion of the fiber optic cable such that at least one optical fiber and the respective buffer tube extend through the sleeve and into the splice closure. According to this advantageous embodiment, the plug encases a portion of the fiber optic cable from which the protective jacket has been removed such that the plug engages a strength member which also extends beyond the protective jacket. As a result of the engagement of the strength member, the fiber optic cable assembly of this advantageous embodiment provides additional strain relief and torsion relief, thereby preventing strain or torque imparted on the fiber optic cable from being transmitted to the optical fibers within the splice closure. Thus, the fiber optic cable assembly of the present invention securely connects the fiber optic cable to the input port of a splice closure in a manner which provides strain relief, torsion relief and a barrier to water migration into the splice closure without extending significantly outward from the wall of the splice enclosure.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 1 is a perspective view of a splice closure which illustrates a fiber optic cable secured within an input port of the splice closure with a fiber optic cable assembly according to one embodiment of the present invention;

FIG. 2 is a partial cross-sectional view illustrating the mechanical engagement of an input port defined within a wall of a splice closure with a fiber optic cable assembly according to one embodiment of the present invention; and FIG. 3 is an exploded perspective view of a fiber optic cable assembly of one embodiment of the present invention.

DETAILED DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, a housing or other enclosure is depicted in which one or more optical fibers are coupled or spliced to other optical fibers. This housing will hereinafter be termed a splice closure 10. The splice closure defines an internal cavity in which the incoming optical fibers are coupled or spliced to respective ones of the outgoing optical fibers. As shown, the splice closure defines a plurality of input ports 12 which extend through a wall 14 of the splice closure and open into the internal cavity.

As shown in partial cross section in FIG. 2, the input port 12 is typically defined by a sleeve 16 which extends through a wall 14 of the splice closure 10. The sleeve has first and second opposed ends 18 which define respective apertures 20 through which a fiber optic cable 22 can extend. In particular, the aperture 20a defined by the first end 18a opens into the splice closure. In addition, the aperture defined by the first end is smaller than the aperture 20b defined by the second end 18b which faces the exterior of one splice closure. Accordingly, the aperture defined by the first end of the sleeve permits one or more buffer tubes 24 containing optical fibers 25 to extend into the splice closure, while retaining the various components of the fiber optic cable assembly 26 within the sleeve. As also illustrated in FIG. 2 and described in more detail hereinafter, the second end of the sleeve is preferably internally threaded so as to engage a corresponding threaded male member.

As illustrated in FIG. 2, the sleeve 16 preferably includes an anchoring member 28, such as a rib, which extends both outwardly from the sleeve and circumferentially about a medial portion of the sleeve in order to engage interior portions of the wall 14 of the splice closure 10. Accordingly, the sleeve can be molded into the wall during fabrication of the splice closure. Alternatively, the sleeve can be inserted following fabrication of the splice closure, such as by adhering the sleeve within a bore defined through a wall of the splice closure, without departing from the spirit and scope of the present invention.

Typically, the sleeve 16 is formed of a metal. However, the sleeve can be formed of other materials without departing from the spirit and scope of the present invention.

As illustrated in FIGS. 2 and 3, the fiber optic cable assembly 26 of the present invention includes several components for securely connecting a fiber optic cable 22 within the input port 12 of a splice closure 10. In particular, the fiber optic cable assembly includes a fiber optic cable having an end portion adapted to extend through the input port and into the splice closure. As known to those skilled in the art, a fiber optic cable typically includes at least one optical fiber 25 disposed within a respective buffer tube 24. A fiber optic cable also typically includes a strength member 30 extending lengthwise along the buffer tube and a protective jacket 32 surrounding the strength member and the buffer tube. For example, the fiber optic cable can include a single central buffer tube in which one or more optical fibers are disposed. The fiber optic cable of this exemplary embodiment would also typically include a strength member, such as a KEVLAR® yarn, extending lengthwise along or about the buffer tubes. Alternatively, the fiber optic cable can include one or more buffer tubes disposed about a centrally located support member, such as a metallic rod.

As also illustrated in FIGS. 2 and 3, the protective jacket 32 is preferably removed from the end portion of the fiber optic cable 22 such that at least one buffer tube 24 and the respective optical fibers 25 extend through the sleeve 16 and into the splice closure 10. Thereafter, the optical fibers can be spliced or optically connected to one or more other optical fibers in order to make the desired optical connections.

Although the fiber optic cable assembly 26 of the present invention will be described and illustrated in conjunction with a prestubbed fiber optic cable in which the protective jacket 32 has been removed from an end portion of the cable in order to expose the buffer tubes 24 and the respective optical fibers 25, the fiber optic cable assembly of the present invention can be employed in conjunction with an unstubbed fiber optic cable in which the protective jacket has not been removed from the end portion thereof. Although not illustrated, the fiber optic cable may also be pre-connectorized such that connectors are mounted on the end portions of respective ones of the optical fibers to further facilitate interconnection of the optical fibers within the splice closure 10.

As illustrated in FIGS. 2 and 3, the fiber optic cable assembly 26 also includes a plug 34 encasing a portion of the fiber optic cable 22. As shown, the fiber optic cable extends both forwardly from the plug into the splice closure 10 and rearwardly from the plug away from the splice closure once the fiber optic cable assembly has been mounted within the sleeve 16. As shown in partial cross-section in FIG. 2, the plug preferably encases the transitional region of the fiber optic cable. Thus, the plug preferably encases a portion of the fiber optic cable surrounded by the protective jacket 32, as well as a portion of the fiber optic cable from the which the protective jacket has been removed. Accordingly, the plug securely engages the strength members 30 of the fiber optic cable which extend beyond the protective jacket. As described below, the engagement of the strength members by the plug provides strain relief and torsion relief for the optical fibers 25 within the splice closure.

Typically, the plug 34 is formed of a material which is impervious to water or moisture. For example, the plug can be formed of an epoxy, as disclosed in the '874 patent, which is molded about the transitional region of the fiber optic cable 22. Thus, the plug serves as a barrier to prevent moisture traveling along the fiber optic cable from entering the splice closure 10. However, the plug can include a clamp or other type of build out which is secured about the fiber optic cable without departing from the spirit and scope of the present invention.

The sleeve 16 defines an internal cavity having a predetermined shape and size. As a result, the plug 34 of one advantageous embodiment also has a predetermined shape and size which are selected to match predetermined shape and size of the internal cavity defined by the sleeve. Thus, the plug will snugly fit within the sleeve.

The fiber optic cable assembly 26 of the present invention also includes a retaining member 36, such as a threaded male retaining nut, mounted about a portion of the fiber optic cable 22 rearward of the plug 34. As shown in FIGS. 2 and 3, the retaining member is preferably threaded for engaging the threaded second end 18b of the sleeve 16. Since the retaining member is rearward of the plug, the engagement of the retaining member and the sleeve will securely retain the plug, as well as the portion of the fiber optic cable encased by the plug, within the sleeve.

The fiber optic cable assembly 26 can also include a grommet 38 formed of a compressible material. The grommet is also mounted upon the fiber optic cable 22 adjacent the plug 34. For example, the grommet is typically mounted about a portion of the fiber optic cable forward of the plug in order to provide a further barrier to moisture migration into the splice closure 10 as described below.

During installation, the protective jacket 32 is preferably removed from an end portion of the fiber optic cable 22. Thereafter, the retaining member 36, such as a threaded male retaining nut, is typically mounted or slid upon the fiber optic cable. The plug 34, such as an epoxy plug, is then formed about a predetermined portion of the fiber optic cable forward of the retaining member. Preferably, the plug is formed about the transitional region of the fiber optic cable such that the plug securely engages the strength members 30 which extend beyond the protective jacket. In embodiments in which the fiber optic cable is not prestubbed by removing the protective jacket from the end portion of the fiber optic cable, however, the plug can be formed entirely about the protective jacket without departing from the spirit and scope of the present invention.

Once the plug 34 has been formed about a portion of the fiber optic cable 22, the grommet 38 is preferably mounted upon the end portion of the fiber optic cable forward of the plug. The end portion of the fiber optic cable is then extended through the input port 12 defined by the sleeve 16 such that the end portion of the fiber optic cable extends through the aperture 20a defined by the first end 18a of the sleeve and into an internal cavity defined by the splice closure 10. The fiber optic cable is preferably extended through the sleeve until the grommet and the plug abut the first end of the sleeve. Since the grommet and the plug are larger than the aperture defined by the first end of the sleeve, the grommet and the plug are retained within the sleeve. Thereafter, the retaining member 36 is advanced along the fiber optic cable and is threadably engaged with the second end 18b of the sleeve.

The components of the fiber optic cable assembly 26, namely, the retaining member 36, the plug 34 and the grommet 38, are preferably sized such that the engagement of the retaining member with the second end 18b of the sleeve 16 will compress the grommet. As a result, the grommet will expand radially to further fill the sleeve and to provide an additional barrier to water migration along the fiber optic cable 22 and into the splice closure 10.

In contrast to conventional fiber optic cable assemblies 26 for securing a fiber optic cable 22 within the input port 12 of a splice closure 10, the fiber optic cable assembly of the present invention does not extend significantly beyond the wall 14 of the splice closure. For example, in the illustrated embodiment, only the head portion 36a of the retaining member 36 extends outwardly from the wall of the splice closure. In addition, while the first end 18a of the sleeve 16 is shown to extend slightly inward from the wall of the splice closure into the internal cavity, the sleeve and the various components of the fiber optic cable assembly of another advantageous embodiment are sized such that the entire sleeve and all components of the fiber optic cable assembly are disposed within the wall of the splice closure.

As a result, the fiber optic cable assembly 26 of the present invention significantly reduces the space required for connection of fiber optic cables 22 to the splice closure 10 in comparison with conventional fiber optic cable assemblies. In addition, fiber optic cable assembly of the present invention permits the interior cavity of the splice closure to remain open for routing and interconnection of the optical fibers 25 and is not filled with portions of the fiber optic cable assembly or other hardware, such as brackets, as required by conventional fiber optic cable assemblies.

In addition to preventing water migration along the fiber optic cable 22 from entering the internal cavity defined by the splice closure 10, the fiber optic cable assembly 26 of the present invention also protects the optical fibers 25 within the splice closure from strain or torque imparted to the fiber optic cable outside of the splice closure. In particular, the engagement of the fiber optic cable and, more particularly, the engagement of the strength members 30 of the fiber optic cable by the plug 34 and the secure retention of the plug within the sleeve 16 effectively isolates the optical fibers within the splice closure from strain or torque imparted to the fiber optic cable outside of the splice closure. Thus, forces acting upon the fiber optic cables outside the splice closure will not degrade or otherwise impair the optical interconnection between respective ones of the optical fibers within the splice closure.

In the drawings and the specification, there has been set forth a preferred embodiment of the invention and, although specific terms are employed, the terms are used in a generic and descriptive sense only and not for purpose of limitation, the scope of the invention being set forth in the following claims.

The invention claimed is:

1. A fiber optic cable assembly for providing a sealed junction within an input port of a splice closure, the fiber optic cable assembly comprising:

a fiber optic cable having an end portion adapted to extend through the input port and into the splice closure;

a plug encasing a portion of said fiber optic cable such that said fiber optic cable extends both forwardly from said plug into the splice closure and rearwardly from said plug away from the splice closure, said plug having a predetermined shape and size such that said plug can be disposed within the input port;

an annular grommet mounted about said fiber optic cable and adjacent said plug, said grommet also having a predetermined shape and size such that said grommet can also be disposed within the input port; and a retaining member mounted about a portion of said fiber optic cable rearward of said plug for operably engaging the input port of the splice closure such that said grommet, said plug and the portion of said fiber optic cable encased by said plug are securely retained therein.

2. A fiber optic cable assembly according to claim 1 wherein said fiber optic cable comprises at least one optical fiber disposed within a respective buffer tube, a strength member extending lengthwise along said buffer tube and a protective jacket surrounding said strength member and said buffer tube, and wherein said protective jacket has been removed from the end portion of said fiber optic cable such that said at least one optical fiber and said respective buffer tube extend through the input port and into the splice closure.

3. A fiber optic cable assembly according to claim 2 wherein said plug encases a portion of said fiber optic cable from which said protective jacket has been removed such that said plug engages said lengthwise extending strength member.

4. A fiber optic cable assembly according to claim 1 wherein the predetermined shape and size of said plug is selected to match the shape and size of an internal cavity defined by the input port.

5. A fiber optic cable assembly according to claim 1 wherein said plug is comprised of a water impervious material.

6. A fiber optic cable assembly according to claim 5 wherein said plug is comprised of an epoxy.

7. A fiber optic cable assembly according to claim 1 wherein said grommet is disposed forward of said plug.

8. An input port assembly for providing a sealed junction upon the insertion of a fiber optic cable into a splice closure, the input port assembly comprising:

a sleeve mounted within a wall of the splice closure, said sleeve extending between opposed first and second ends, said first and second ends defining respective apertures through which the fiber optic cable extends, wherein the aperture defined by the first end opens into the splice closure and is smaller than the aperture defined by the second end;

a plug encasing a portion of the fiber optic cable such that the fiber optic cable extends both forwardly from said plug into the splice closure and rearwardly from said plug away from the splice closure, said plug disposed within said sleeve and having a predetermined shape and size which is larger than the aperture defined by the first end of said sleeve; and a retaining member mounted about a portion of the fiber optic cable rearward of said plug for operably engaging the second end of said sleeve such that said plug and the portion of the fiber optic cable encased by said plug are securely retained within the sleeve.

9. An input port assembly according to claim 8 wherein said sleeve defines an internal cavity having a predetermined shape and size, and wherein the predetermined shape and size of said plug is selected to match the predetermined shape and size of the internal cavity defined by said sleeve.

10. An input port assembly according to claim 8 wherein said sleeve further comprises an anchoring member extending outwardly for engaging the wall of the splice closure.

11. An input port assembly according to claim 8 wherein said plug is comprised of a water impervious material.

12. An input port assembly according to claim 11 wherein said plug is comprised of an epoxy.

13. An input port assembly according to claim 8 further comprising an annular grommet mounted about said fiber optic cable and adjacent said plug, said grommet also having a predetermined shape and size such that said grommet can be disposed within said sleeve.

14. A fiber optic cable assembly for providing a sealed junction upon insertion into a splice closure, the fiber optic cable assembly comprising:

a sleeve mounted within a wall of the splice closure, said sleeve extending between opposed first and second ends, said first and second ends defining respective apertures, wherein the aperture defined by the first end opens into the splice closure and is smaller than the aperture defined by the second end;

a fiber optic cable having an end portion extending through the respective apertures defined by the first and second ends of said sleeve and into the splice closure;

a plug encasing a portion of said fiber optic cable such that said fiber optic cable extends both forwardly from said plug into the splice closure and rearwardly from said plug away from the splice closure, said plug disposed within said sleeve and having a predetermined shape and size which is larger than the aperture defined by the first end of said sleeve;

an annular grommet mounted about said fiber optic cable and disposed within said sleeve adjacent said plug; and a retaining member mounted about a portion of said fiber optic cable rearward of said plug for operably engaging the second end of said sleeve such that said grommet, said plug and the portion of said fiber optic cable encased by said plug are securely retained within said sleeve.

15. A fiber optic cable assembly according to claim 3 wherein said fiber optic cable comprises at least one optical fiber disposed within a respective buffer tube, a strength member extending lengthwise along said buffer tube and a protective jacket surrounding said strength member and said buffer tube, and wherein protective jacket has been removed from the end portion of said fiber optic cable such that said at least one optical fiber and said respective buffer tube extend through the aperture defined by the first end of said sleeve and into the splice closure.

16. A fiber optic cable assembly according to claim 14 wherein said plug encases a portion of said fiber optic cable from which said protective jacket has been removed such that said plug engages said lengthwise extending strength member.

17. A fiber optic cable assembly according to claim 14 wherein said sleeve defines an internal cavity having a predetermined shape and size, and wherein the predetermined shape and size of said plug is selected to match the predetermined shape and size of the internal cavity defined by said sleeve.

18. A fiber optic cable assembly according to claim 14 wherein said sleeve further comprises an anchoring member extending outwardly for engaging the wall of the splice closure.

19. A fiber optic cable assembly according to claim 14 wherein said grommet is disposed forward of said plug.

* * * * *